United States Patent [19]

Nordquist

[11] Patent Number: 5,501,283

[45] Date of Patent: Mar. 26, 1996

[54] HOLE CUTTING DEVICE FOR RECOVERING TARGETS LOCATED WITH A METAL DETECTOR

[76] Inventor: H. Dean Nordquist, 57 Knight St., Glens Falls, N.Y. 12801

[21] Appl. No.: 280,154

[22] Filed: Jul. 25, 1994

[51] Int. Cl.⁶ ............................ A01B 1/24; E21B 25/00
[52] U.S. Cl. .................. 172/22; 175/20; 175/40; 73/864.44
[58] Field of Search .............. 172/22, 19; 175/20, 175/40; 73/864.44

[56] References Cited

U.S. PATENT DOCUMENTS

| | | |
|---|---|---|
| 3,273,930 | 9/1966 | Gottfried . |
| 3,326,049 | 6/1967 | Eley ................... 73/864.44 X |
| 3,464,732 | 9/1969 | Woodward . |
| 3,696,873 | 10/1972 | Anderson ................. 175/20 |
| 3,756,323 | 9/1973 | Mays ..................... 172/22 |
| 4,114,543 | 9/1978 | Mitchell ............... 172/22 X |
| 4,359,110 | 11/1982 | Peterson ................. 175/20 |
| 4,383,583 | 5/1983 | Baker ..................... 175/20 |
| 4,549,612 | 10/1985 | Cushing ................. 175/20 |
| 4,763,735 | 8/1988 | Gay ..................... 172/22 X |
| 4,884,638 | 12/1989 | Hoffman ................. 172/22 |
| 4,958,688 | 9/1990 | Marrow et al. ........... 172/22 |
| 4,974,682 | 12/1990 | Hoffman ................. 172/22 |
| 5,046,301 | 9/1991 | Adkins ............... 73/864.44 X |
| 5,242,024 | 9/1993 | Van Houten ............. 172/19 |

Primary Examiner—Terry Lee Melius
Assistant Examiner—Christopher J. Novosad
Attorney, Agent, or Firm—John A. Merecki

[57] ABSTRACT

A hole cutting device for rapidly and accurately recovering metal targets discovered with a metal detector, without the grass damage commonly produced by presently available target recovery techniques. The hole cutting device includes a cylindrical cutting tube for cutting and capturing a plug of grass and soil according to the detected depth of a target, a handle for driving the cylindrical cutting tube into the ground, thereby creating a cylindrical hole in the ground centered about the target, a depth indicator for providing an instantaneous reading of the depth of the tube cutting edge as it is rotatably driven into the ground, and a hand actuated ejection mechanism for freeing the cylindrical tube from the hole after target recovery and the reinsertion of the plug therein.

6 Claims, 4 Drawing Sheets

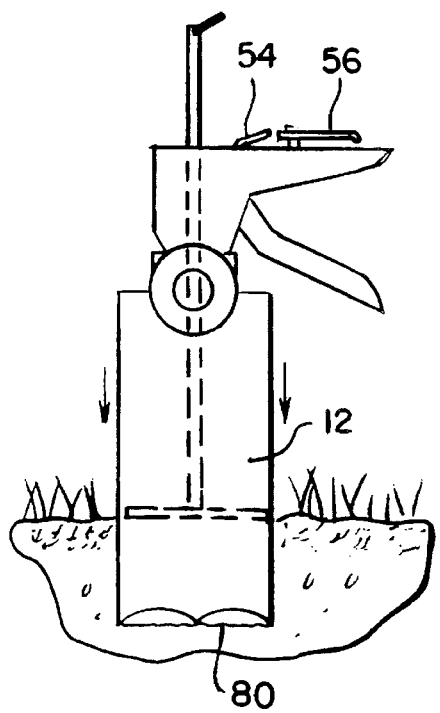
FIG. 11
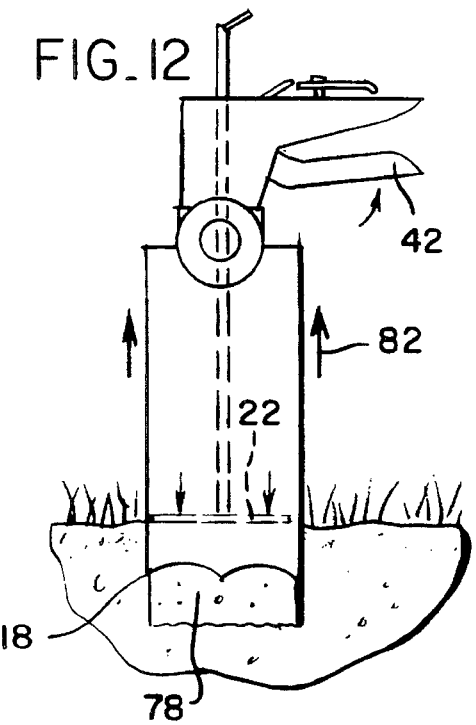
FIG. 12
FIG. 14
FIG. 13
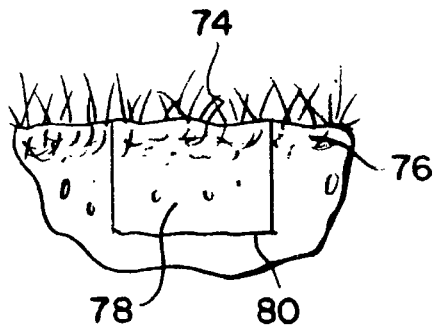
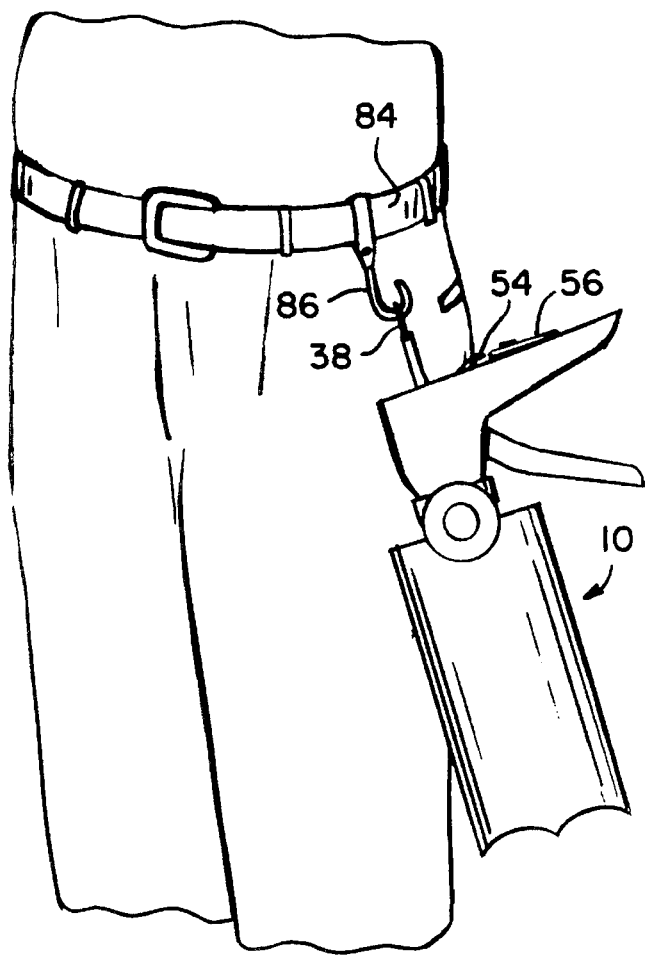

HOLE CUTTING DEVICE FOR RECOVERING TARGETS LOCATED WITH A METAL DETECTOR

FIELD OF THE INVENTION

The present invention relates to the hobby of metal detecting and, more particularly, to a novel hole cutting device for quickly and accurately recovering metal targets discovered with a metal detector, without the ancillary grass damage commonly associated with presently available target recovery techniques and apparatus. Generally, the hole cutting device of the present invention includes a cylindrical cutting tube for cutting and capturing a plug of grass and soil according to the approximate depth of a target (as measured by a metal detector), wherein the target being recovered is either disposed in the bottommost section of the plug or in the uppermost section of the resultant hole, a handle for manipulating the hole cutting device and for driving the cylindrical tube into the ground, and a hand actuated ejection mechanism for freeing the cylindrical tube from the hole after the plug of grass and soil has been replaced therein. The hole cutting device of the present invention is designed to neatly cut a plug of grass and soil, to temporarily remove the plug from the ground during the recovery of the detected target, and to imperceptibly replace the plug into its corresponding hole. Advantageously, after the replacement of the plug, it is virtually impossible to visually determine the location of the hole. This is extremely important to a metal detectorist (hereinafter referred to as a "detectorist") who desires to hunt targets buried under a well manicured lawn, especially if the detectorist wishes to continue receiving permission to search the same lawn at a later date.

BACKGROUND OF THE INVENTION

Many techniques have been successfully employed to recover targets discovered with a metal detector. In fact, several disparate techniques may be alternately utilized by an individual detectorist, depending upon the depth of the target being recovered.

Targets located between one to three inches (1"–3") deep may be buried within the root structure of most grass species. As such, the removal of a shallow target may require delicate handling to avoid disturbing the transfer of ground moisture to the surrounding soil. As most experienced detectorists can attest, grass is easily killed when the moist dirt attached to the grass roots is removed or otherwise distressed. To minimize any associated grass damage, a probe, such as a screwdriver having a rounded tip, may be utilized in conjunction with a knife, garden trowel, or other cutting implement, to recover a target.

When utilizing a probe recovery technique, it is vitally important to initially pinpoint the target. Specifically, after the general location of the target has been established using a metal detector, a probe is inserted into the ground until the target is contacted. Using the insertion depth of the probe as a guide, a cutting implement is utilized to carefully cut a slit above the target, wherein the slit is approximately three to five inches (3"–5") in length and has a depth slightly less than the insertion depth of the probe. Thereafter, the probe is inserted diagonally into the ground from an end of the slit until its distal end is positioned underneath the target. By levering the dirt under the target with the end of the probe, the target is forced upwardly through the slit. Upon successful recovery of the target, the slit is closed by hand.

Targets buried more than three inches (3") deep generally cannot be recovered with the above-described probe recovery technique. With such deep targets, a detectorist oftentimes utilizes a plugging technique to retrieve the target from the ground.

As with the probe recovery technique, it is extremely important to initially pinpoint the target with a metal detector prior to employing a plug-type target recovery technique. Thereafter, once the location and depth of the target have been determined, a three-sided square plug, having sides approximately four to five inches (4"–5") in length, is cut with a knife or garden trowel around the target, with the fourth, uncut side of the square plug serving as a hinge. As known in the art, the hinged, uncut side of the square plug allows the plug to be reinserted into the ground substantially in its original orientation. When cutting the sides of the plug, the cutting implement should be inserted perpendicularly into the ground to minimize grass root damage, and to insure that the plug will remain in the ground after replacement. The target may then be retrieved from beneath the square plug by folding the plug over on its uncut side, thereby exposing the underlying soil. After successfully recovering the target from the soil, the plug is pivoted in a reverse direction about its uncut side and replaced in its original position.

The above-described probe and plugging recovery techniques have long been successfully utilized by detectorists to retrieve a target from the ground. Unfortunately, the resultant grass damage, the prolonged, inaccurate target retrieval, and the large number of tools required for the practice of such recovery techniques, leave many detectorists longing for a quicker, simpler, less damaging and more accurate method of target recovery.

SUMMARY OF THE INVENTION

In order to avoid the disadvantages of the prior art, the present invention provides a tubular hole cutting device for rapidly and accurately retrieving metal targets discovered with a metal detector. The hole cutting device includes a cylindrical cutting tube, preferably formed of a corrosion resistant metal, for cutting and capturing a plug of grass and soil according to the detected depth of a target. A handle, mounted to the upper rim of the cylindrical cutting tube, is utilized to rotate and drive the cutting edge of the cylindrical cutting tube into the ground, thereby creating a cylindrical hole in the ground centered about the target. A depth indicator provides an instantaneous reading of the depth of the tube cutting edge as it is rotatably inserted into the ground.

The hole cutting device further includes a hand actuated ejection mechanism for freeing the cutting tube from a previously cut target hole after target recovery and the subsequent replacement of the corresponding plug of grass and soil therein. Preferably, the ejection mechanism includes a piston member having a piston head, a piston rod, and a bar-type ratcheting system for controlling the longitudinal displacement of the piston member within the cylindrical cutting tube.

Unlike other, currently utilized target recovery techniques, the hole cutting device of the present invention is designed to minimally disturb the grass roots disposed in the upper section of the captured, enclosed plug, thereby substantially eliminating any associated grass damage. Specifically, due to the superior cutting depth accuracy of the hole cutting device of the instant invention, a substantial portion of a captured plug remains undisturbed within the cylindrical cutting tube during the recovery of a target; the target is generally located either in the bottommost section of the plug or in the uppermost section of the hole formed by the removal of the plug. Further, the hole cutting device additionally provides for the precise replacement of the captured plug into its corresponding hole by utilizing a unique ejection mechanism for extracting the cylindrical cutting tube from the hole after the plug of grass and soil has been reinserted.

BRIEF DESCRIPTION OF THE DRAWING

These and other features and advantages of the present invention will become readily apparent upon reading the following detailed description and upon reference to the drawings in which:

FIGS. 11 through 13 illustrate the reinsertion of the cut plug into the ground; and FIG. 14 illustrates the removable attachment of the hole cutting device of the present invention to the belt of an operator.

DETAILED DESCRIPTION OF THE INVENTION

Figure 1:
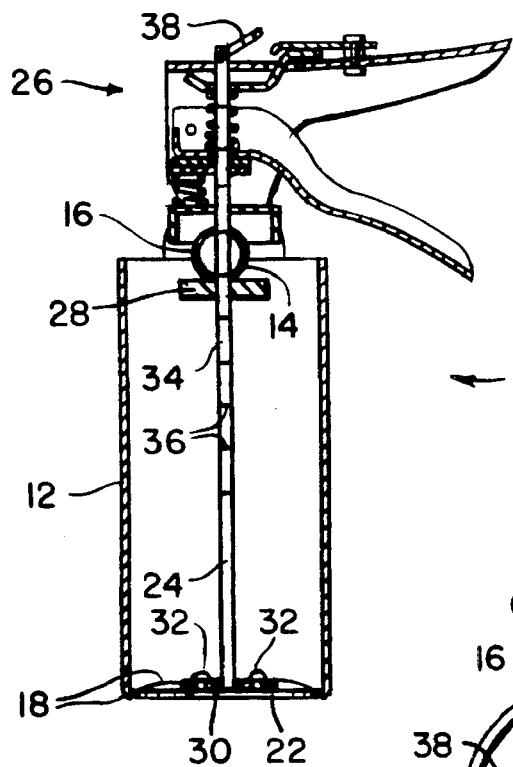
FIG. 1 is a cross-sectional view of a hole cutting device in accordance with a preferred embodiment of the present invention.

Referring now specifically to the drawings, there is illustrated a hole cutting device, generally designated as 10, for accurately recovering targets located with a metal detector, wherein like reference numerals refer to like components throughout the drawings.

Figure 2:
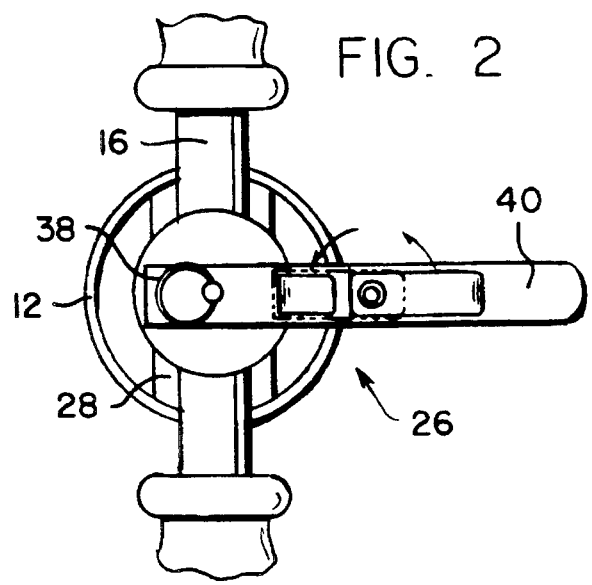
FIG. 2 is a partial top view of the hole cutting device illustrated in FIG. 1.
Figure 3:
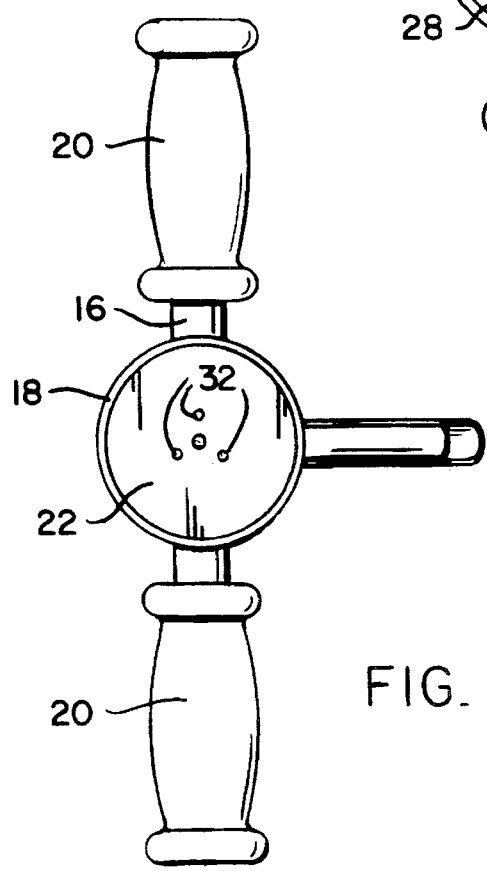
FIG. 3 is a bottom view of the hole cutting device illustrated in FIG. 1.

As illustrated in FIGS. 1 through 3, the hole cutting device 10 includes a cylindrical cutting tube 12 for cutting and removing a captured plug of grass and soil from the ground, and for subsequently reinserting the cut plug into its corresponding hole. The upper rim of the cylindrical cutting tube 12 includes a semicircular, concave indentation 14 for symmetrically receiving sections of a handle member 16 therein, wherein the handle member 16 is utilized to rotatably drive the cutting edge 18 of the cylindrical cutting tube 12 into the ground. As detailed hereinafter, a cylindrical hole is formed in the ground upon removal of the cylindrical cutting tube 12 and the captured plug. Preferably, the opposing end sections of the handle are each enclosed within a soft, comfortable, dumbbell-shaped foam cover 20 which is designed to prevent or reduce operator hand slippage, thereby facilitating the operation of the hole cutting device 10 as the cylindrical cutting tube 12 is rotatably inserted into the ground.

A hand actuated ejection mechanism, comprising a piston head 22, a piston rod 24 and a ratcheting system 26, is utilized to free the cylindrical cutting tube 12 from the ground after the reinsertion of the captured plug. The hand actuated ejection mechanism is bolted or otherwise suitably secured to a mounting bar 28 which spans the inner diameter of an upper portion of the cylindrical cutting tube 12. The distal end of the piston rod 24 includes a head portion 30 having a diameter substantially larger than the diameter of the piston rod 24. The head portion 30 may be fastened in any known manner to the end of the piston rod 24 or may be formed integrally therewith. Preferably, the head portion 30 of the piston rod is symmetrically mounted to the piston head 22 using a plurality of rivets 32 or other fastening hardware. Generally, I have found that at least three rivets 32 should be utilized to maintain the piston head 22 perpendicular to the piston rod 24.

The piston rod 24 includes a graduated upper portion 34 which serves the additional function of a depth indicator. Specifically, the graduated upper portion 34 of the piston rod 24 incorporates a plurality of indicia 36 designed to provide an instantaneous indication of the depth of the tube cutting edge 18 as it is being driven into the ground. This function will be addressed further hereinbelow with reference to FIGS. 8 and 9. Disposed on the upper end of the piston rod 24 is a loop 38 for securing the hole cutting device 10 to the belt of an operator.

Figure 4:
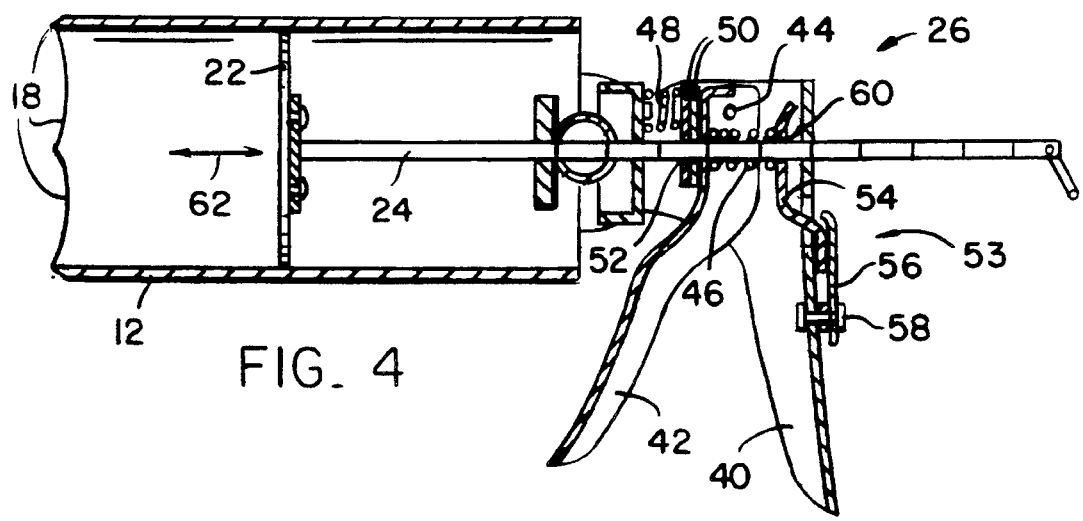
FIG. 4 is a cross-sectional illustration of the plug cutting configuration of the hole cutting device, wherein the piston locking mechanism is maintained in a disengaged state, and the piston member is freely displaceable longitudinally within the cylindrical cutting tube.
Figure 5:
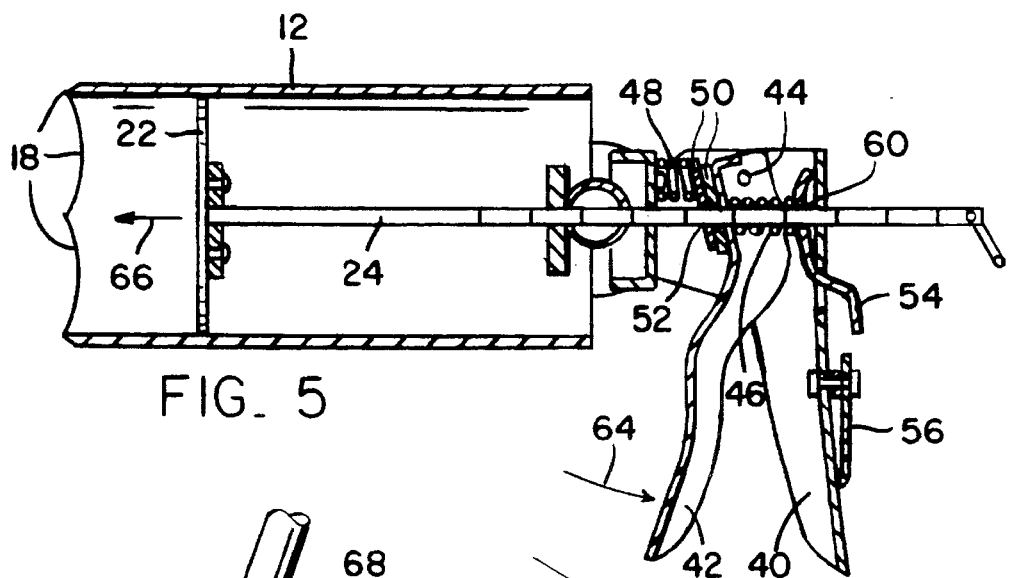
FIG. 5 is a cross-sectional illustration of the plug reinsertion configuration of the hole cutting device, wherein the piston locking mechanism is engaged, and the piston member is displaceable toward the cutting edge of the cylindrical cutting tube only upon the actuation of the movable handle portion of the ratcheting system.

The operation of the ratcheting system 26 is most clearly illustrated in FIGS. 4 and 5. The ratcheting system 26 incorporates a stationary handle portion 40, a movable handle portion 42 pivotable about pivot point 44, and first and second biasing springs 46 and 48, respectively, for biasing the movable handle portion 42 toward its forwardmost operational position (FIG. 4). A pair of apertured ratcheting bars 50, each including an opening 52 having a diameter slightly larger than the diameter of the piston rod 24, are utilized to selectively drive the piston rod 24 and attached piston head 22 longitudinally toward the cutting edge 18 of the cylindrical cutting tube 12 in response to a rearwardly directed displacement of the movable handle portion 42. A piston locking mechanism 53, comprising a piston rod engaging section 54 and a latch 56, is provided to selectively limit the longitudinal displacement of the piston rod 24 within the cylindrical cutting tube 12. The latch 56 is rotatably secured to the stationary handle portion 40 of the ratcheting system by a rivet 58. The upper end of the piston rod engaging section 54 includes an opening 60, having a diameter slightly larger than the diameter of the piston rod 24, for slidably receiving the piston rod therethrough.

Figure 8:
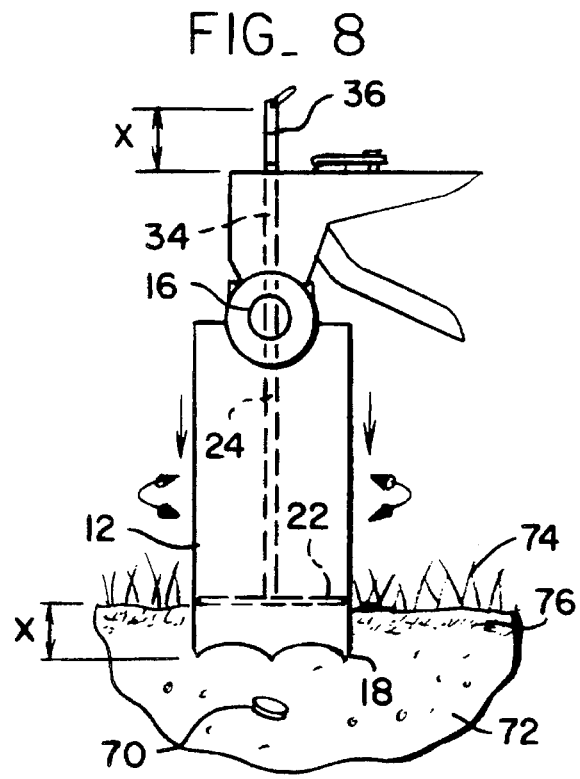
Figure 9:
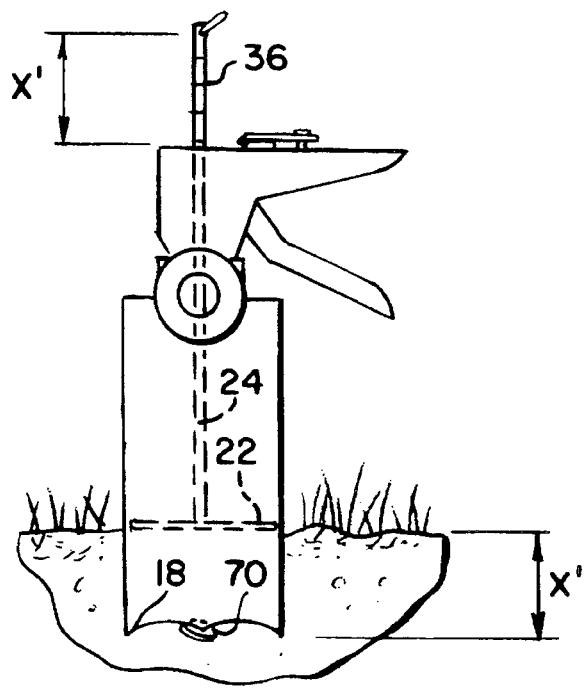
Figure 10:
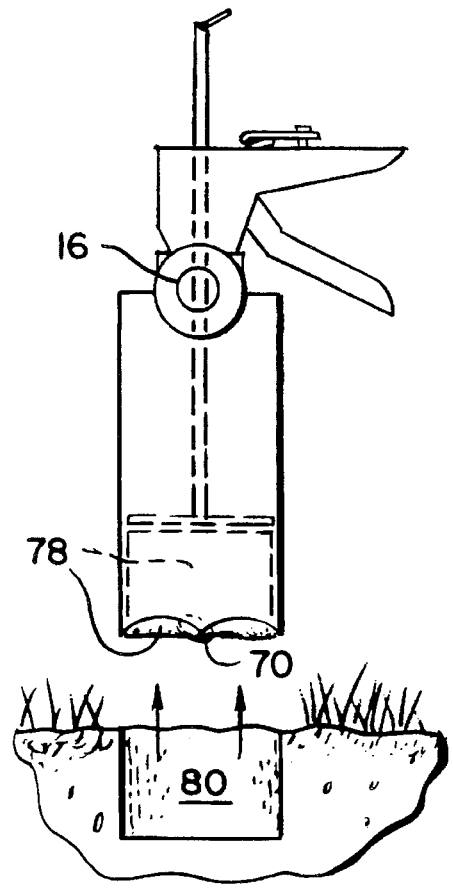

As illustrated in FIG. 4, the piston rod 24 and attached piston head 22 are freely displaceable longitudinally along the length of the cylindrical cutting tube 12 when the rotatable latch 56 is secured over the lower end of the piston rod engaging section 54. In this configuration, the piston rod 24 is concentrically disposed within the openings 52 and 60 and, as depicted by direction arrow 62, slides easily through each opening. Accordingly, the piston head 22 is forced into the tube 12, away from the tube cutting edge 18, when pressure is applied against the bottom edge of the piston head 22 as the cutting edge 18 of the cylindrical cutting tube 12 is inserted into the ground (FIGS. 8 and 9). Of course, when the rotatable latch 56 is disengaged from the lower end of the piston rod engaging section 54, the hole 60 is no longer concentric with the piston rod 24. Consequently, the upper and lower opposing surfaces of the hole 60 tightly engage the outer surface of the piston rod 24, thereby limiting the displacement of the piston rod 24 within the cylindrical cutting tube 12.

When the movable handle portion 42 is pivoted in a rearward direction about pivot point 44 (directional arrow 64), and the rotatable latch 56 is disengaged from the lower end of the piston rod engaging section 54 (FIG. 5), the pair of apertured ratcheting bars 50 are rotated about the piston bar 24. As such, the upper and lower opposing surfaces of each bar opening 52 engage the outer surface of the piston bar 24, thereby propelling the piston bar and attached piston head 22 forward (directional arrow 66) toward the cutting edge 18 of the cylindrical cutting tube 12. It should be noted that piston rod 24 is not freely movable within the cylindrical cutting tube 12 when the rotatable latch 56 in its disengaged position. However, the forwardly directed force provided by the rotation of the pair of apertured ratcheting bars 50 is sufficient to overcome the locking action of the piston locking mechanism 53, thereby enabling the forward displacement of the piston head and rod 22, 24. Upon the release of the movable handle portion 42, the first and second biasing springs 46, 48, bias the movable handle portion 42 and the ratcheting bars 50 toward their original orientation. As should by readily apparent, the piston head 22 may be displaced along substantially the entire length of the cylindrical cutting tube 12 by repeatedly actuating the movable handle portion 42.

The target recovery operation of the present invention is fully illustrated with reference to FIGS. 6 through 12.

Figure 6:
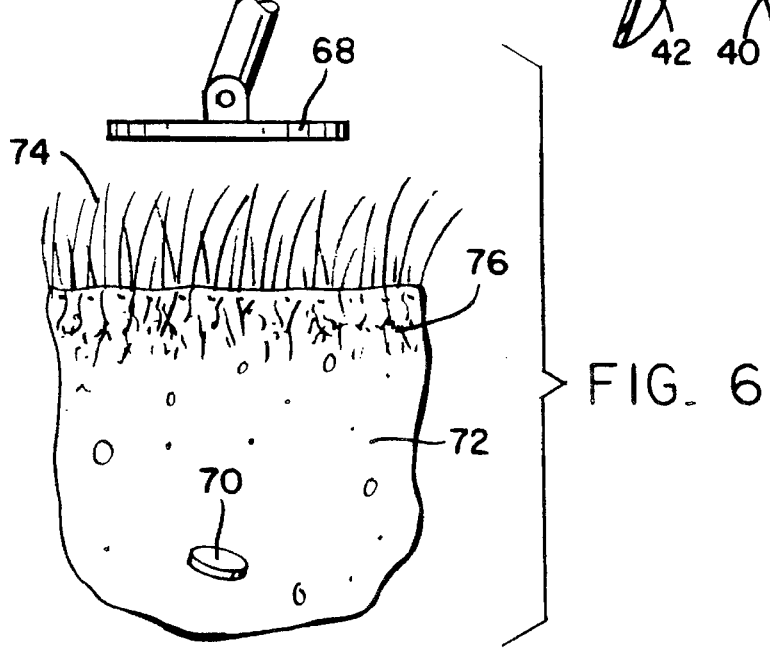
FIG. 6 illustrates the detection and pinpointing of a metal target buried in the ground.
Figure 7:
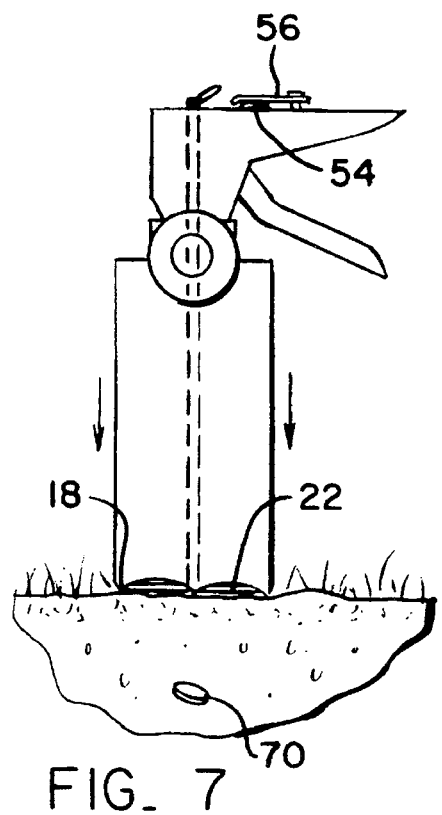
FIGS. 7 through 10 illustrate the accurate retrieval of the detected target using the hole cutting device of the present invention, with the target located either in the bottommost section of the plug or in the uppermost section of the hole formed by the removal of the plug.

In FIG. 6, a metal detector 68 is utilized to initially pinpoint a metal target 70 in the ground 72. Typically, older targets are buried in the ground 72 several inches below the level of the grass 74 and grass roots 76.

After the target 70 has been accurately pinpointed, the cylindrical cutting tube 12 is centered over the location of the target (FIG. 7), with the rotatable latch 56 secured over the lower end of the piston rod engaging section 54, and the piston head 22 flush against the ground. As is well known in the metal detecting field, most newer metal detectors are designed to accurately determine not only the location of a target, but also the depth of the target in the ground. Advantageously, by predetermining the depth of the target, the target recovery operation is greatly simplified using the hole cutting device 10 of the present invention.

As depicted in FIG. 8, the cutting edge 18 of the cylindrical cutting tube 12 is designed to be rotatably driven into the ground 72 through the grass 74 and grass roots 76. Handle member 16 is utilized by the operator to apply a downwardly, rotating force -on the cutting edge 18. As the cutting edge 18 penetrates the ground, the piston head 22 and attached piston rod 24 are propelled upwardly through the cylindrical cutting tube 12 a distance x. As should be readily apparent, the distance x corresponds to the depth of the cutting edge 18 in the ground 72. As the piston head and rod 22, 24, are propelled upwardly through the cylindrical cutting tube 12, the graduated upper portion 34 of the piston rod 24 extends an identical distance x from the top of the stationary handle portion 40. By observing the indicia 36 on the graduated upper portion 34 of the piston rod 24, an operator is provided with an instantaneous indication of the cutting depth of the hole cutting device 10.

When the indicia 36 correspond to the predetermined depth x' of the detected target (FIG. 9), the plug 78, enclosed within the cylindrical cutting tube 12, is removed from the ground (FIG. 10) by pulling upwardly on the handle member 16. Upon removal of the plug 78, the metal target 70 should be located either in the bottommost section of the captured plug 78 or proximate the bottom of the hole 80 formed by the removal of the plug 78. After plug removal, the hole 80 should be scanned with a metal detector to determine whether the metal target 70 is located within the hole 80. If the metal detector determines that the target is disposed within the hole 80, the target is easily recovered with a probe or the like. If the metal detector produces a negative response, the detectorist is assured that the metal target 70 is located in the bottommost section of the captured plug 78. Once again, the target is easily recovered from the bottom on the plug using a probe or the like.

After the successful recovery of the metal target, the substantially undisturbed captured plug 78 is reinserted into the ground as illustrated in FIGS. 11 and 12. First, the cylindrical cutting tube 12 is fully inserted in the hole 80, and the rotatable latch 56 is detached from the lower end of the piston rod engaging section 54 (FIG. 11). Thereafter, the movable handle portion 42 is repeatedly actuated, thereby forcing the piston head 22 toward the cutting edge 18 of the cylindrical cutting tube 12 and against the top of the enclosed plug 78 (Fig. 12). As a result, the cylindrical cutting tube 12 is forced upward out of the hole 80 as indicated by directional arrows 82. As illustrated in FIG. 13, the plug 78 is barely noticeable after reinsertion; the grass 74 and grass roots 76 located on top of and adjacent the plug 78 remain substantially undisturbed, thereby minimizing any ancillary grass damage.

Referring finally to FIG. 14, there is illustrated the removable attachment of the hole cutting device 10 to the belt 84 of an operator. Specifically, a hook 86, which is suitably secured about the belt 84, is inserted through the loop 38 located on the upper end of the piston rod 24. When attaching the loop 38 of the hole cutting device 10 to an operator's belt 84 via hook 86, the rotatable latch 56 should be disengaged from the lower end of the piston rod engaging section 54 to prevent any unwanted displacement of the piston rod 24.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. A hole cutting device for recovering a metal target discovered with a metal detector, said metal target being buried at a depth X in a layer of soil, said metal detector providing an operator of said hole cutting device with an indication of said depth X, comprising:

a cutting tube having a cutting edge and an opposing, upper rim;

a handle member, mounted proximate the upper rim of said cutting tube, for rotatably driving the cutting edge of said cutting tube into said soil toward said metal target, with the cutting edge of said cutting tube positioned above said metal target;

a piston member having a piston rod and a piston head mounted to a first end of said piston rod, said piston member extending longitudinally within said cutting tube and mounted concentrically therewith, wherein said piston head is longitudinally displaced toward the upper rim of said cutting tube by said soil as the cutting edge of said cutting tube is driven into said soil, the longitudinal displacement of said piston head propelling a second, opposing end of said piston rod outwardly beyond the upper rim of said cutting tube, the second, opposing end of said piston rod including a first connecting element for removably securing said hole cutting device to a second, complementary connecting element disposed on an operator of said hole cutting device, said soil forming a plug within said cutting tube, said cutting tube forming a hole in said soil upon removal of said cutting tube; and a depth indicator, formed integrally with the second end of said piston rod, for providing an instantaneous depth measurement of the cutting edge of said cutting tube as said cutting edge is driven into the soil, said depth indicator being propelled by said piston rod outwardly beyond the upper rim of said cutting tube;

wherein said metal target is located proximate the cutting edge of said cutting tube when said depth indicator indicates said depth X.

2. A hole cutting device according to claim 1, further including a mechanism for driving said piston head against an upper portion of the plug enclosed within said cutting tube, and for subsequently freeing said cutting tube from the soil, said plug remaining within said hole.

3. A hole cutting device according to claim 1, further including a releasable locking member for selectively preventing the longitudinal displacement of said piston head within said cutting tube.

4. A hole cutting device for recovering a buried metal target comprising:

a cutting tube having a cutting edge and an opposing, upper rim;

a handle member, mounted proximate the upper rim of said cutting tube, for rotatably driving the cutting edge of said cutting tube into said soil toward said metal target;

a piston member having a piston rod and a piston head mounted to a first end of said piston rod, said piston member extending longitudinally within said cutting tube and mounted concentrically therewith, wherein said piston head is longitudinally displaced toward the upper rim of said cutting tube by said soil as the cutting edge of said cutting tube is driven into said soil, the longitudinal displacement of said piston head propelling a second, opposing end of said piston rod outwardly beyond the upper rim of said cutting tube, said soil forming a plug within said cutting tube, said cutting tube forming a hole in said soil upon removal of said cutting tube;

a depth indicator, formed integrally with the second end of said piston rod, for providing an instantaneous depth measurement of the cutting edge of said cutting tube as the cutting edge is driven into said soil, said depth indicator being propelled by said piston rod outwardly beyond the upper rim of said cutting tube in response to the longitudinal displacement of said piston head within said cutting tube as the cutting edge of said cutting tube is driven into said soil; and wherein the second, opposing end of said piston rod includes a first connecting element for removably securing said hole cutting device to a second, complementary connecting element disposed on an operator of said hole cutting device.

5. A hole cutting device according to claim 4, further including a mechanism for driving said piston head against an upper portion of the plug enclosed within said cutting tube, and for freeing said cutting tube from the soil, said plug remaining within said hole.

6. A hole cutting device according to claim 4, further including a releasable locking member for selectively preventing the longitudinal displacement of said piston head within said cutting tube.

* * * * *